(12) United States Patent
Kobayashi et al.

(10) Patent No.: US 9,002,919 B2
(45) Date of Patent: Apr. 7, 2015

(54) DATA REARRANGING CIRCUIT, VARIABLE DELAY CIRCUIT, FAST FOURIER TRANSFORM CIRCUIT, AND DATA REARRANGING METHOD

(75) Inventors: Yuki Kobayashi, Minato-ku (JP); Katsutoshi Seki, Minato-ku (JP)

(73) Assignee: NEC Corporation, Tokyo (JP)

( * ) Notice: Subject to any disclaimer, the term of this patent is extended or adjusted under 35 U.S.C. 154(b) by 458 days.

(21) Appl. No.: 13/497,553

(22) PCT Filed: Jun. 3, 2010

(86) PCT No.: PCT/JP2010/059443
§ 371 (c)(1),
(2), (4) Date: Mar. 22, 2012

(87) PCT Pub. No.: WO2011/036918
PCT Pub. Date: Mar. 31, 2011

(65) Prior Publication Data
US 2012/0278373 A1    Nov. 1, 2012

(30) Foreign Application Priority Data
Sep. 24, 2009   (JP) .................................. 2009-218919

(51) Int. Cl.
*G06F 17/14*    (2006.01)
(52) U.S. Cl.
CPC ..................................... *G06F 17/142* (2013.01)

(58) Field of Classification Search
None
See application file for complete search history.

(56) References Cited

U.S. PATENT DOCUMENTS

| 5,440,514 | A | * | 8/1995 | Flannagan et al. ............. 365/194 |
| 5,808,925 | A |   | 9/1998 | Ito et al. |
| 2002/0194235 | A1 | * | 12/2002 | Yamamoto et al. ........... 708/403 |
| 2005/0038842 | A1 | * | 2/2005 | Stoye ............................ 708/306 |

FOREIGN PATENT DOCUMENTS

| JP | 06-342449 A | 12/1994 |
| JP | 08-320857 A | 12/1996 |
| JP | 10-032474 A | 2/1998 |
| JP | 10-283341 A | 10/1998 |
| JP | 2002-504250 A | 2/2002 |
| JP | 2003-150576 A | 5/2003 |
| JP | 2005-235045 A | 9/2005 |
| JP | 2008-537655 A2 | 9/2008 |

* cited by examiner

*Primary Examiner* — Michael D Yaary
(74) *Attorney, Agent, or Firm* — Sughrue Mion, PLLC

(57) ABSTRACT

A data rearranging circuit includes variable delay means and control means. The variable delay means, by imparting a delay of a number of delay cycles that differs for each input cycle and moreover for each port to each unit of data of a data group that is applied as input to a plurality of ports and in a plurality of cycles, switches the order of the data in the same port and supplies the data as the data group at a predetermined delay. The control means supplies control information that includes the number of delay cycles used in the variable delay means.

8 Claims, 9 Drawing Sheets

| MODE | COUNT | CONTROL INFORMATION | | |
|---|---|---|---|---|
| | | FIRST-STAGE DELAY | SHUFFLE | SECOND-STAGE DELAY |
| 001 | 0000 | 2, 3, 2, 3 | 0, 0, 2, 2 | 1, 1, 1, 1 |
| | 0001 | 4, 3, 4, 3 | 0, 0, 2, 2 | 0, 2, 0, 2 |
| | 0010 | 1, 0, 1, 0 | 1, 1, 3, 3 | 0, 2, 0, 2 |
| | 0011 | 1, 2, 1, 2 | 1, 1, 3, 3 | 1, 1, 1, 1 |
| 010 | 0000 | ... | | |
| ... | ... | ... | | |

DATA REARRANGING CIRCUIT, VARIABLE DELAY CIRCUIT, FAST FOURIER TRANSFORM CIRCUIT, AND DATA REARRANGING METHOD

CROSS REFERENCE TO RELATED APPLICATION

This application is a National Stage of International Application No. PCT/JP2010/059443, filed on Jun. 3, 2010, claiming priority based on Japanese Patent Application No. 2009-218919, filed Sep. 24, 2009, the contents of all of which are incorporated herein by reference in their entirety.

TECHNICAL FIELD

The present invention relates to an arithmetic circuit that performs processing of rearranging the order of a plurality of units of sequential data.

BACKGROUND ART

FFT (Fast Fourier Transform) processing is carried out in a base station apparatus of a portable telephone system or a broadcast device for digital broadcasting. The high-throughput and efficient execution of FFT is sought in such devices.

A method of using a radix-2 or radix-4 butterfly arithmetic unit to carry out butterfly computation is known as one method for executing high-throughput FFT.

FIG. 1 shows the processing configuration of a 16-point FFT that uses a butterfly arithmetic unit. As shown in FIG. 1, 16-point FFT can be executed by a radix-4 butterfly computation in two stages. FIG. 2 shows the processing configuration of a 32-point FFT that uses a butterfly arithmetic unit. As shown in FIG. 2, a 32-point FFT can be executed by two stages in a radix-4 butterfly computation and one stage of a radix-2 butterfly computation. In FIGS. 1 and 2, the intersection of two lines represents a radix-2 butterfly computation and the intersection of four lines at a blank circle represents a radix-4 butterfly computation.

In FIGS. 1 and 2, the butterfly computations of each stage are hereinbelow considered to be processed in order from butterfly computations at the top of the figure.

To maximize FFT throughput, efficient use of the butterfly arithmetic unit is preferably achieved by supplying data to the butterfly arithmetic unit for each cycle with as few interruptions as possible. It is effective to treat a plurality of data as row data and supply data to a butterfly arithmetic unit while reading and writing row data that are input/output data or intermediate data to a memory that can read and write one row of data in one cycle. For example, when carrying out four parallel FFT processes, it is effective to treat four units of data as row data and use a memory that stores the four units of data $d(4k)$, $d(4k+1)$, $d(4k+2)$, and $d(4k+3)$ to address k.

However, it is the nature of FFT that outputs are collected from a plurality of butterfly computations of a previous step as the input of the butterfly computation of the succeeding step or that the output is taken from the butterfly computation of a previous step as the inputs of a plurality of butterfly computations of the succeeding step. Accordingly, in FFT, butterfly computations must be carried out with the data of discontinuous indices as the input and output. As a result, it is often impossible to achieve sufficient performance by means of only a row data memory.

For example, in the 16-point FFT shown in FIG. 1, the output of the first butterfly computation of the first stage, i.e., the uppermost blank circle of the first stage in FIG. 1, becomes the input of all four butterfly computations of the second stage. In addition, the input of the first butterfly computation of the second stage is composed of the output of all four butterfly computations of the first stage.

In order to carry out such butterfly computations efficiently, it is demanded that the order of data among a plurality of row data are efficiently rearranged or permutated. One method of rearranging data among a plurality of row data is a method of implementing a transposition process upon memory input/output.

JP-A-2008-537655 discloses a technique of using a transposition memory to rearrange data. In JP-A-2008-537655, a transposition memory enables collection of data among different row data in one row data and distribution of data among a single row data to different row data.

As a more specific example, the transposition of a four-cycle portion of row data can be carried out as shown below.

First, a four-cycle portion of row data shown in Formula (1) is stored.

$$(4h, 4h+1, 4h+2, 4h+3),$$

$$(4i, 4i+1, 4i+2, 4i+3),$$

$$(4j, 4j+1, 4j+2, 4j+3),$$

$$(4k, 4k+1, 4k+2, 4k+3) \tag{1}$$

Next, the transposition of the row data of Formula (1) converts the data to the row data shown in Formula (2):

$$(4h, 4i, 4j, 4k),$$

$$(4h+1, 4i+1, 4j+1, 4k+1),$$

$$(4h+2, 4i+2, 4j+2, 4k+2),$$

$$(4h+3, 4i+3, 4j+3, 4k+3) \tag{2}$$

A case is considered in which these data are used in the 16-point FFT shown in FIG. 1. Input data in memory are typically arranged in numerical order as: x0, x1, x3, . . . . Row data shown in Formula (3) that have been read from the memory in which input data have been stored in this way are transposed to the data shown in Formula (4). The row data of Formula (4) become the input of the first-stage butterfly computation.

$$(x0, x1, x2, x3),$$

$$(x4, x5, x6, x7),$$

$$(x8, x9, x10, x11),$$

$$(x12, x13, x14, x15) \tag{3}$$

$$(x0, x4, x8, x12),$$

$$(x1, x5, x9, x13),$$

$$(x2, x6, x10, x14),$$

$$(x3, x7, x11, x15) \tag{4}$$

The input of the second-stage butterfly computation is obtained by carrying out the same transposition for the output of the first-stage butterfly computation.

JP-A-2003-150576 discloses a technique for efficient execution of rearrangement among row data by improving the method of mapping data to intermediate buffers. This technique also carries out transposition in small data units such as 2×2.

However, there are cases in existing data rearrangement methods in which rearrangement could not be carried out efficiently when a plurality of FFTs of different numbers of points are mixed. More specifically, there are cases in which intervals must be opened between the data rearrangement of a particular row of data and the data rearrangement of the next row of data to avoid collision.

For example, when the second-stage process of the 32-point FFT shown in FIG. 2 is carried out by a radix-4 butterfly computation, the time taken in data rearrangement is six cycles. The actual operations of data rearrangement will be described later. When the second-stage process of the 16-point FFT shown in FIG. 1 is carried out by a radix-4 butterfly computation, the time taken for data rearrangement is three cycles. The actual operations of the data rearrangement will be described later.

When a 16-point FFT is carried out following a 32-point FFT in which the time taken in data rearrangement differs, an interval of at least three cycles must be opened for switching in the input of data to the data rearranging circuit to avoid data collision. Thus, when a plurality of FFT having different numbers of points are mixed, throughput falls due to interruptions of data.

JP-A-10-283341 discloses the configuration and operation of an existing data rearranging circuit. In the technique disclosed in JP-A-10-283341, the data rearranging circuit uses delay circuits and a switch circuit (i.e., shuffle circuit) to rearrange data. FIG. 3 is a schematic view of the data rearranging circuit disclosed in JP-A-10-283341. In addition, JP-A-06-342449 and JP-A-2002-504250 also disclose the configurations and operations of data rearranging circuits that similarly employ delay circuits and shuffle circuits.

Referring to FIG. 3, a portion of the input data is directly applied as input to a shuffle circuit, and the remaining input data are applied as input to the shuffle circuit by way of first-stage delay circuits. A portion of the output of the shuffle circuit directly becomes output data, and the remaining output data becomes output data by way of second-stage delay circuits.

The data rearranging circuit of JP-A-10-283341 carries out rearrangement of data by 2-parallel rearrangement or 4-parallel rearrangement, and can carry out rearrangement according the number of points that are processed by switching the arithmetic mode. In JP-A-10-283341, the amount of delay of each delay circuit is fixed in the same arithmetic mode. Although no mention is made regarding switching of the number of points of FFT, switching of the arithmetic mode must be carried out such that collisions of the output data of the data rearranging circuit are avoided. As a result, when switching the number of points of FFT, the input of data to data rearranging following switching must wait, and increase in throughput is therefore not possible.

FIG. 4 is a timing chart showing the state of data rearrangement for a typical FFT process that uses a circuit for rearranging 4-parallel data. The circuit for rearranging data for a typical FFT process is shown in FIG. 3 as one example. In the example of shown in FIG. 4, rearrangement is first carried out for obtaining data that are the input to the second-stage butterfly computation of 32-point FFT. Rearrangement is then carried out for obtaining data that are the input to the second-stage butterfly computation of 16-point FFT.

FIG. 4 shows the input to the first-stage delay circuits, input to a shuffle circuit, input to the second-stage delay circuits, and output of the second-stage delay circuits, in the circuit of FIG. 3. The input/output ports of each unit are the four ports #0 to #3. In addition, the input data for 32-point FFT are represented by the data names A0 to A31, and the input data for 16-point FFT are represented by the data names B0 to B15.

The input to the data rearranging circuit is the row data shown in Formula (5) and Formula (6) that has undergone transposition every four cycles.

(A0,A1,A2,A3), (A8,A9,A10,A11), (A16,A17,A18,A19), (A24,A25,A26,A27), (A4,A5,A6,A7), (A12,A13,A14,A15), (A20,A21,A22,A23), (A28,A29,A30,A31)  (5)

(B0,B1,B2,B3), (B4,B5,B6,B7), (B8,B9,B10,B11), (B12,B13,B14,B15)  (6)

In the data rearrangement for 32-point FFT shown in the first half of FIG. 4, delays of 0, 2, 4, and 6 cycles are conferred to the inputs of ports #0, #1, #2, and #3, respectively, in the first-stage delay circuits. The output of the first-stage delay circuits is then applied as input to the shuffle circuit. In the shuffle circuit, data are switched or permutated between ports in the same cycle and the output thereof is applied to the second-stage delay circuits. In the second-stage delay circuits delays of 6, 4, 2, and 0 cycles are conferred to the inputs of ports #0, #1, #2, and #3, respectively.

In the data rearrangement for 16-point FFT shown in the second half of FIG. 4, delays of 0, 1, 2, and 3 cycles are conferred to the inputs of ports #0, #1, #2, and #3, respectively, in the first-stage delay. In the shuffle circuit, data are switched or permutated among the ports in the same cycle. In the second-stage delay circuit, delays of 3, 2, 1, and 0 cycles are conferred to the inputs of ports #0, #1, #2, and #3, respectively.

By means of this rearrangement, data rearrangement is realized for the input of the second stage of 32-point FFT and for the input of the second stage of 16-point FFT. For example, (A0, A2, A4, A6) supplied as output in cycle 6 becomes the input of the uppermost butterfly computation of the second stage shown in FIG. 2.

Nevertheless, the delays differ for data rearrangement for 32-point FFT and data rearrangement for 16-point FFT, as described hereinabove. As a result, data for 16-point FFT cannot be continuously applied as input to data rearranging circuit after the data for 32-point FFT. To avoid data collisions, data cannot be applied as input for an interval of three cycles as shown in cycles 8 to 10 of the first-stage delay input shown in FIG. 4, and the throughput of the FFT process therefore drops. This drop in throughput becomes more significant with increase in the frequency of occurrence of switching to FFT of different numbers of points.

JP-A-2005-235045 discloses a technique of using a ring buffer to carry out data rearrangement. However, JP-A-2005-235045 discloses a method in which rearrangement and butterfly computations are realized by software and makes no disclosure regarding a method of efficient rearrangement by hardware. In JP-A-2005-235045, input data of one series are stored in order in a ring buffer, and output data are rearranged by supplying under the control of software. Although this method allows the switching of the time order of data, this method is not practical for parallel installation by hardware due to the large amount of hardware. In JP-A-2005-235045, moreover, a degree of freedom is afforded to the order of execution of rearrangement and FFT through the use of both a ring buffer of the same size as the number of points of FFT and two data buffers for the data that are the object of computation. However, it is inevitably impractical to realize the resulting total of three buffers by hardware due to the increase in the amount of hardware.

SUMMARY

As described hereinabove, when the data rearrangement method changes in a data rearranging circuit, a drop in throughput occurs due to the wait for the input of data. For example, when switching the FFT to an FFT of a different number of points, the data rearranging circuit cannot carry out the rearrangement of data continuously. In addition, apart from FFT, continuous data rearrangement cannot be realized in an apparatus that uses similar data rearranging circuits.

It is an object of the present invention to provide a data rearranging circuit and method that allow continuous input of data despite changes of the rearranging method.

To achieve the above-described object, the data rearranging circuit according to the present invention includes:

variable delay means that, by giving to each unit of data of a data group that is applied as input to a plurality of ports in a plurality of cycles, a delay of a number of delay cycles that differs for each input cycle, and moreover, for each port, switches the order of data in the same port and supplies output as the data group at a predetermined delay; and control means that supplies control information that includes the number of delay cycles that is used in the variable delay means.

The data rearrangement method of the present invention includes:

generating control information that includes a number of delay cycles that differs for each input cycle and moreover for each port, the control information being established such that the order of data in the same port for each unit of data of a data group that is applied as input to a plurality of ports and in a plurality of cycles is switched and the data group has a predetermined delay; and based on the control information, giving to input data a delay of a number of delay cycles that differs for each input cycle and moreover for each port and supplying the result.

BRIEF DESCRIPTION OF THE DRAWINGS

FIG. 13 shows an example of the state of rearrangement of input data of a 32-point FFT and a 16-point FFT realized by the data rearranging circuit according to the exemplary embodiment; and FIG. 14 is a detailed timing chart showing an example of input data rearrangement of 32-point FFT and 16-point FFT that uses the data rearranging circuit according to the present exemplary embodiment.

EXEMPLARY EMBODIMENTS

Exemplary embodiments for carrying out the present invention are next described in detail with reference to the accompanying drawings.

In the following description, explanation regards an example of a data rearranging circuit that rearranges four series of parallel data, but the circuit can also be configured to handle data of three or less or five or more series of parallel data.

Figure 5:
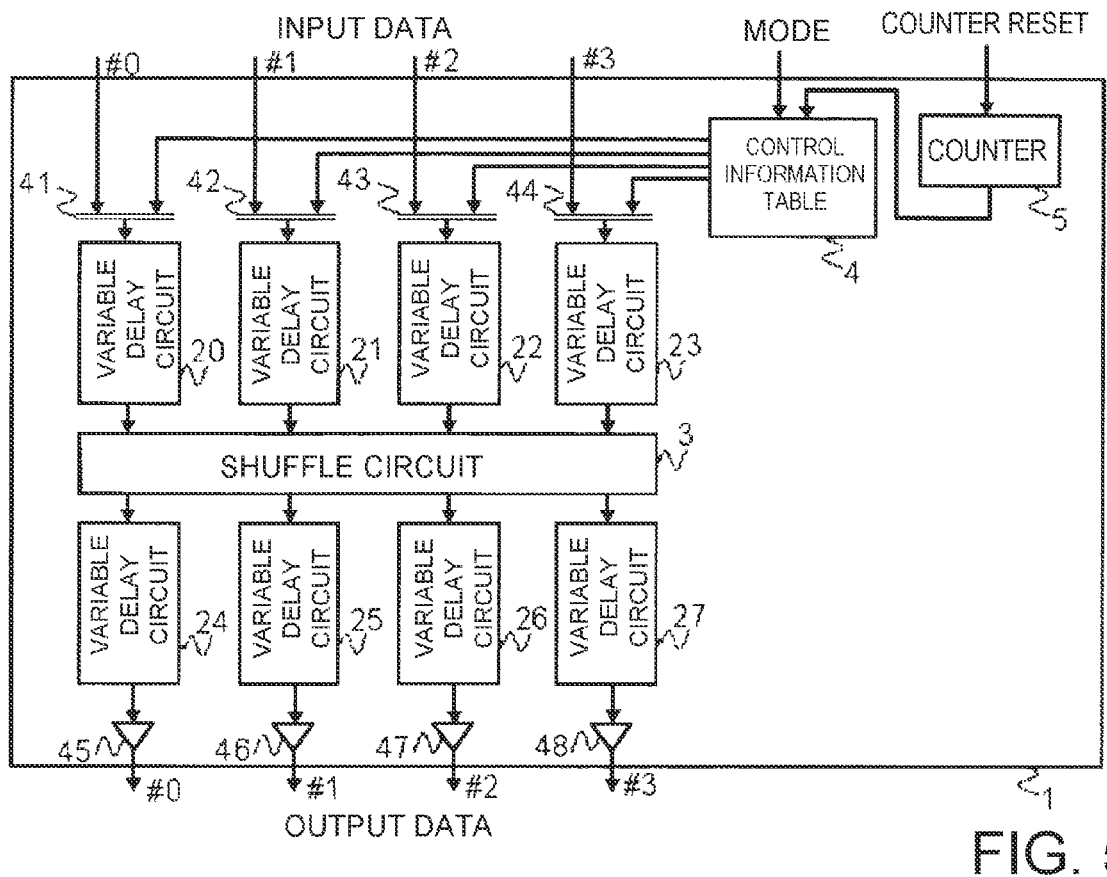
FIG. 5 is a block diagram showing the configuration of a data rearranging circuit according to an exemplary embodiment.

Referring to FIG. 5, data rearranging circuit 1 according to the exemplary embodiment of the present invention is made up from first-stage variable delay circuits 20 to 23, shuffle circuit 3, second-stage variable delay circuits 24 to 27, control information table 4, control information couplers 41 to 44, control information eliminators 45 to 48, and counter 5. Input data, a mode signal, and a counter reset signal are applied as input to data rearranging circuit 1. Data rearranging circuit 1 supplies output data.

In this case, a mode signal is a signal for designating the type of rearrangement pattern (i.e., operation mode) such as rearrangement for a 64-point FFT or rearrangement for a 32-point FFT. The counter reset signal is a signal for designating the start time of a rearrangement pattern. Counter 5 is reset by the counter reset signal, following which counter 5 counts up for each of cycles that are units of the amount of delay.

Control information that corresponds to combinations of the count value indicated by counter 5 and the operation mode indicated by the mode signal is stored in control information table 4. The control information includes the amounts of delay of first-stage variable delay circuits 20 to 23, the control information of shuffle circuit 3, and the amounts of delay of second-stage variable delay circuits 24 to 27.

The control information that is supplied from control information table 4 is coupled with input data at control information couplers 41 to 44 and applied as input to first-stage variable delay circuits 20 to 23. In addition, the control information is removed from the coupled data that is supplied from second-stage variable delay circuits 24 to 27 at control information eliminators 45 to 48. The data obtained by removing control information from coupled data are the output data of data rearranging circuit 1.

Figure 6:
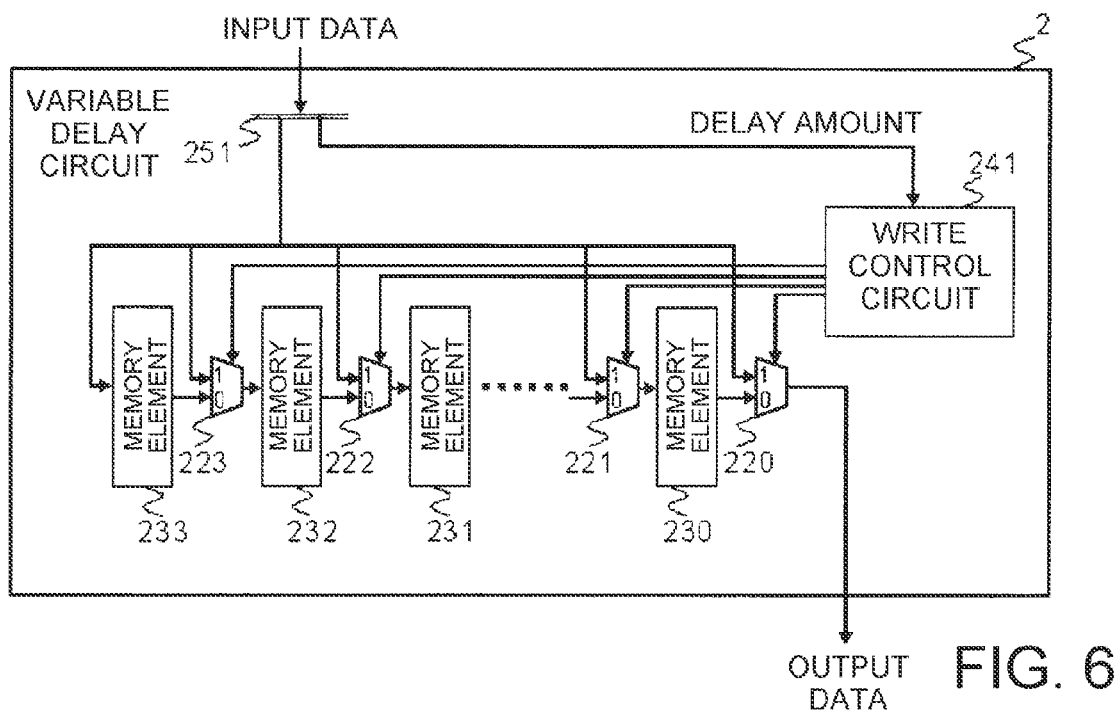
FIG. 6 is a block diagram showing the configuration of a variable delay circuit in the exemplary embodiment.

FIG. 6 shows the configuration of variable delay circuit 2. First-stage variable delay circuits 20 to 23 and second-stage variable delay circuits 24 to 27 are of the same configuration. FIG. 6 shows the configuration that is common to those variable delay circuits.

Referring to FIG. 6, variable delay circuit 2 includes a plurality of memory elements 230 to 233, selectors 220 to 223 selecting the data that are to be stored in the memory elements, write control circuit 241, and delay amount extractor 251.

Memory elements 230 to 233 are connected in a series by way of selectors 220 to 223 and transfer data one stage per cycle from left to right in the figure. Selectors 220 to 223 select one of the two inputs in accordance with a control signal from write control circuit 241 and supply the selected data as output. Selectors 220 to 223 supply input data from delay amount extractor 251 if the control signal is "1" and supply input data from memory elements 230 to 233 if the control signal is "0."

Delay amount extractor 251 extracts the amount of delay of variable delay circuit 2 from the input data and imparts the amount of delay to write control circuit 241. As described hereinabove, the input data include the amount of delay of the first-stage and second-stage variable delay circuits. Delay amount extractor 251 extracts the amount of delay of a first-stage variable delay circuit if its own device is a first-stage variable delay circuit and extracts the amount of delay of a second-stage variable delay circuit if its own device is a second-stage variable delay circuit.

Write control circuit 241 gives control signals to each selector in accordance with the amount of delay that has been imparted. In this way, input data are stored in the memory elements that correspond to the amounts of delay. For example, when the amount of delay is "1," only second selector 221 from the right makes the control signal "1." In this way, input data are stored in memory element 230 on the extreme right and the other memory elements 231 to 233 can receive the values of the memory elements that are one to the left. Regarding the output data, output of memory element 230 that is on the extreme right is supplied when the amount of delay of input data is other than "0" and the input data is supplied as output when the amount of delay of input data is "0."

Figure 7:
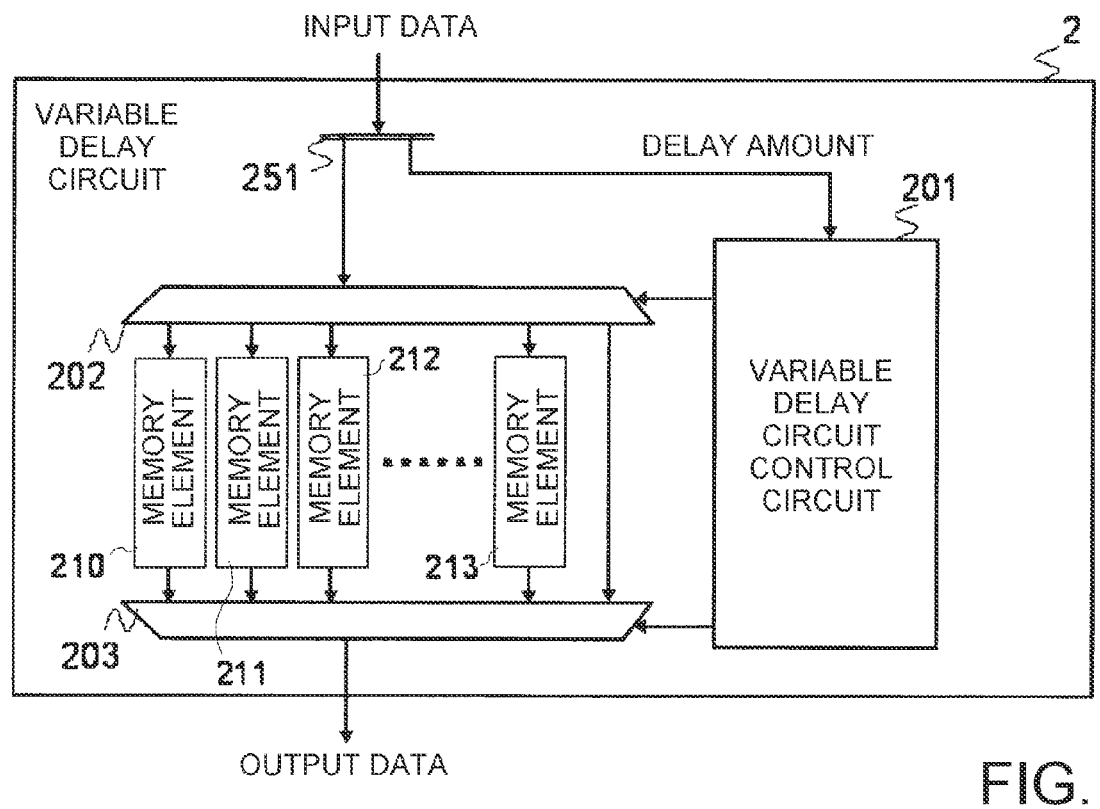
FIG. 7 is a block diagram showing another configuration of the variable delay circuit in the exemplary embodiment.

It should be noted that variable delay circuit 2 may be realized by, instead of the configuration of FIG. 6, another mode such as the configuration of a ring buffer that uses a memory element group that allows individual control of the write position and read position. FIG. 7 shows variable delay circuit 2 that uses the configuration of a ring buffer.

Variable delay circuit 2 includes a plurality of memory elements 210 to 213, variable delay circuit control circuit 201, delay amount extractor 251, write data selector 202, and read data selector 203. In this case, the output data that are to be supplied as output in that cycle are determined from among the memory element group by variable delay circuit control circuit 201. Variable delay circuit control circuit 201 then uses read data selector 203 to select the value of the memory element as the output data. In other words, selection and output is carried out to make a round of all memory elements as in a ring buffer.

When the amount of delay of input data is "0," the input data of that cycle are supplied as output without alteration.

Delay amount extractor 251 extracts the amount of delay of variable delay circuit 2 from the input data and gives the amount of delay to variable delay circuit control circuit 201. Variable delay circuit control circuit 201 determines the appropriate memory element for the amount of delay that has been given and uses write data selector 202 to store the input data in that memory element. For example, when the amount of delay is "3," variable delay circuit control circuit 201 should implement control such that input data of that cycle are written to the memory element from which data are supplied after three cycles.

Figure 8:
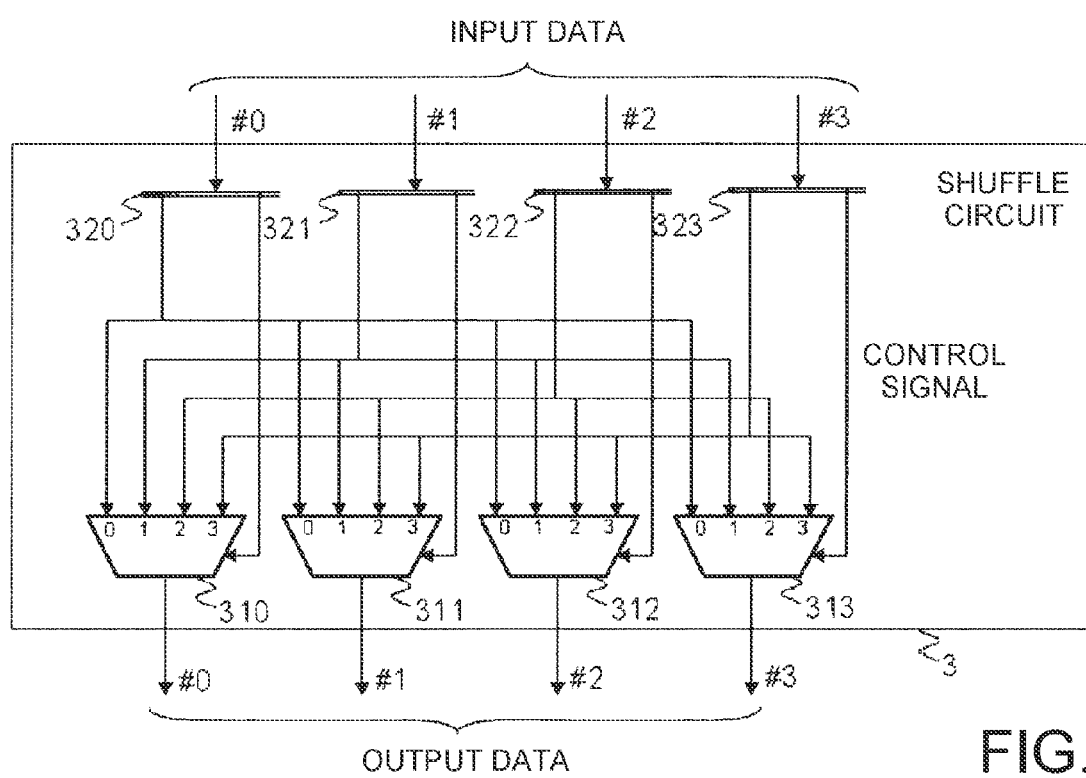
FIG. 8 is a block diagram showing the configuration of a shuffle circuit in the exemplary embodiment.

FIG. 8 shows the configuration of shuffle circuit 3. Shuffle circuit 3 includes selectors 310 to 313, control information extractors 320 to 323.

Control information extractors 320 to 323 extract control information of shuffle circuit 3 from input data, give the control signal to data selectors 310 to 313, and distribute the input data to all selectors 310 to 313.

Data selectors 310 to 313 take the four units of input data from all control information extractors 320 to 323 as input, and in accordance with the control signals that have been given, select and supply signals from among the input data.

Although the configuration shown in FIG. 8 has been here described as an example of the configuration of shuffle circuit 3, shuffle circuit 3 may be of other configurations that allow switching of output ports. For example, instead of selecting from which input port data are to be selected for each output port, a configuration may be adopted in which the output port is selected for each input port.

In addition, variable delay circuit 2 and shuffle circuit 3 may or may not be pipelined using a pipeline register. In the case of shuffle circuit 3 that is not pipelined, for example, data that are received as input in a particular cycle are shuffled and supplied in that cycle. In the case of shuffle circuit 3 that is pipelined, data that have been received as input in a previous cycle are shuffled and the supplied in a succeeding cycle.

The operations of the entire apparatus of the present exemplary embodiment are next described in detail with reference to FIGS. 5, 9 and 10.

Figures 9, 10:
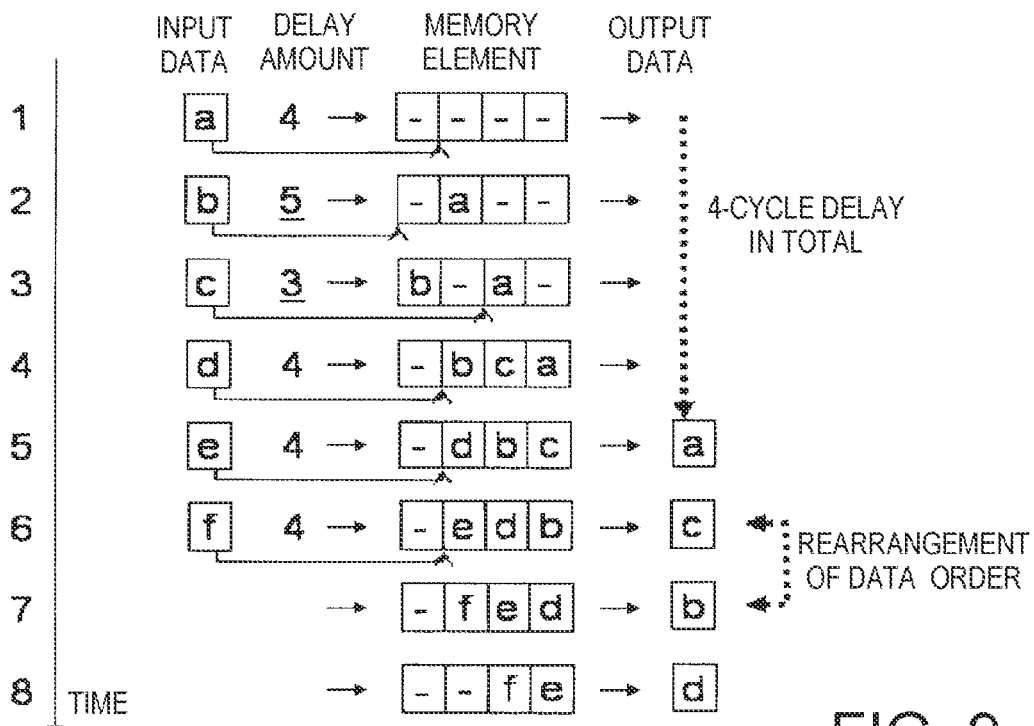
FIG. 9 shows an example of the state of data rearrangement realized by the variable delay circuit in the exemplary embodiment.
FIG. 10 is a timing chart showing an example of data rearrangement realized by the data rearranging circuit in the exemplary embodiment.

FIG. 9 shows an example of the sequential rearrangement of data using variable delay circuit 2. It is assumed that input data are applied in the order a, b, c, and d from times 1 to 4. If amounts of delay represented by the number of cycles are given as 4, 5, 3, and 4 at this time, the output data are supplied in the order a, c, b, and d, thereby allowing switching or exchange of the order of data b and c.

Because this is a delay of four cycles throughout, collisions of data do not occur even if the same rearrangement is implemented before and after these data groups. In other words, rearrangement can be executed with throughput at one data unit per cycle. In addition, data rearranging circuit 1 shown in FIG. 5 can be realized by combining a plurality of variable delay circuits 2 and shuffle circuit 3.

Figures 11, 12:
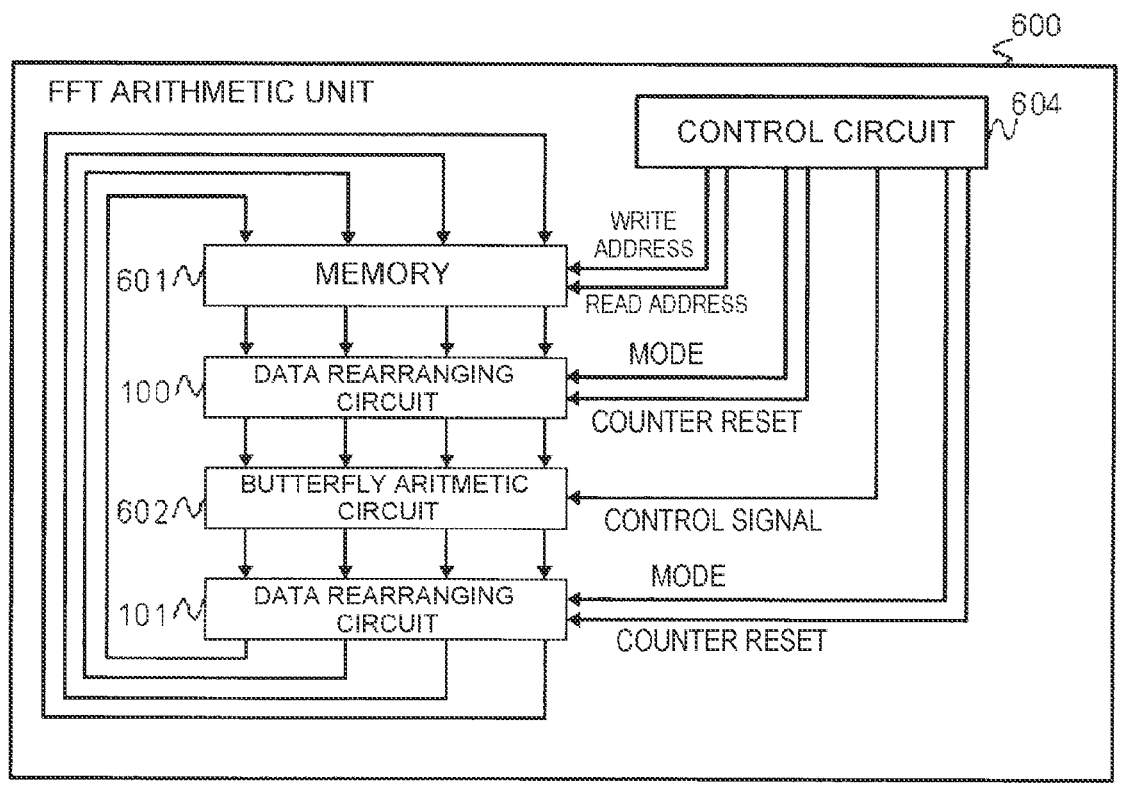
FIG. 11 shows an example of a control information table that is used in the data rearranging circuit in the exemplary embodiment.
FIG. 12 is a block diagram showing the configuration of an FFT arithmetic unit in an Example.

FIG. 10 shows an example of the manner of data rearrangement that uses data rearranging circuit 1 of FIG. 5. The content of control information table 4 at this time is shown in FIG. 11. As the control information in the table of FIG. 11, values for port #0, #1, #2 and #3 are recorded for each of the first-stage delays, shuffle, and second-stage delays.

In FIG. 10, at the first cycle (i.e., cycle 0), the count reset signal is effective and counter 5 is therefore reset. In addition, during the first four cycles, the mode signal is "001," and the control signals of the first row of the control information table shown in FIG. 11 are therefore read in the first cycle. The control signals that are read are coupled with input data in control information couplers 41 to 44 and applied as input to first-stage variable delay circuits 20 to 23. In FIG. 10, data that are coupled with the control information are expressed in the format: "data name (first-stage delay amount, shuffle control signal, second-stage delay amount)." These data are referred to as coupled data.

For example, the first-stage delay amount for data that are applied as input to input port #0 of count 0000 is "2," and the control information of two-cycle delay is therefore coupled with input data A of the first cycle and supplied from first-stage variable delay circuit 20 at cycle 2. Similarly, because the first-stage delay amount for input port #0 of count 0001 in FIG. 11 is "4," control information that indicates a four-cycle delay is coupled with data C that is applied as input at cycle 1 and supplied from first-stage variable delay circuit 20 at cycle 5. The control information in the coupled data is delayed and shuffled together with the data in the coupled data.

Coupled data E that is received as input at input port #0 of shuffle circuit 3 in cycle 3 include control information in which the shuffle control information indicates "1." As a result, coupled data B that is at input #1 of shuffle circuit 3 are supplied to output #0 of shuffle circuit 3 in cycle 3. Similarly, coupled data E that is at input #0 of shuffle circuit 3 is supplied to output #1 of shuffle circuit 3.

Coupled data B that are applied as input to input #0 of a second-stage variable delay circuit in cycle 3 include "1" as the second-stage delay amount. As a result, coupled data B are supplied from the second-stage variable delay circuit 25 in the next cycle, which is cycle 4. Similarly, the second-stage delay amount of coupled data E that are applied as input to input #1 of the second-stage variable delay circuit in cycle 3 is "0," and coupled data E are therefore supplied from second-stage variable delay circuit 25 in the same cycle, which is cycle 3.

The use of variable delay circuit 2 enables change of the temporal order between data that are applied as input to the same input port at different timings. For example, the temporal order of C and E that are applied as input to input #0 of first-stage variable delay circuit is switched at output #0 of first-stage variable delay circuit. In addition, the use of shuffle circuit 3 enables data rearrangement among different input ports. As a result, the present exemplary embodiment enables the realization of complex rearrangement in which input data are flexibly rearranged both temporally and spatially.

The number of operation modes and the number of counter bits used in the present exemplary embodiment are only examples, and various other configurations are possible. For example, the number of modes may be increased to handle rearrangement for FFT of various point numbers or processing other than FFT. Alternatively, the number of counter bits may be increased to handle rearrangement of data of voluminous quantity.

In the present exemplary embodiment, a configuration has been described by way of example in which the value of counter 5 that is reset by means of a counter reset signal is used as is to refer to a control information table, but other configurations are also possible. For example, a configuration may be adopted in which the maximum counter value is set for each mode, following which the control information table is consulted using the remainder obtained by dividing the value of counter 5 by the maximum counter value for each mode, or the control information table is consulted using a portion of the bit string of counter 5 that is extracted so as to fall below the maximum value of counter for each mode. In this way, the table can serve as both a control information table for large-scale rearrangement and a control information table for small-scale rearrangement, enabling a reduction of the size of the table.

In addition, when extracting delay amounts from coupled data, delay amount extractor 251 shown in FIG. 6 or FIG. 7 may leave information of the delay amount in the coupled data or may delete information of the delay amount. Control information extractors 320 to 323 may leave or delete control information in coupled data. For example, the delay amount of the first-stage delay is used only in the first-stage variable delay circuit, and the first-stage variable delay circuit may therefore delete the delay amount. When delay amount extractor 251 and control information extractors 320 to 323 delete respective information, control information eliminators 45 to 48 in data rearranging circuit 1 shown in FIG. 5 are unnecessary.

According to the present exemplary embodiment as described hereinabove, by giving a delay of a different number of delay cycles for each cycle and for each port to a data group of a plurality of ports and a plurality of cycles, the data rearranging circuit temporally switches the order of data within the same port and supplies the result as a data group at a fixed delay. As a result, the data can be applied continuously to the data rearranging circuit despite change of the rearrangement method.

In addition, according to the present exemplary embodiment, the data rearranging circuit further effects spatial switching among ports in the same cycle and supplies data that have been applied as input to a plurality of ports and in a plurality of cycles, whereby data can be applied as input continuously to the data rearranging circuit even when switching is carried out not only temporally but also spatially.

EXAMPLES

The above-described exemplary embodiment is next described with respect to an actual Example.

FFT arithmetic unit 600 according the present Example shown in FIG. 12 includes: butterfly arithmetic circuit 602; two data rearranging circuits, input-side data rearranging circuit 100 and output-side data rearranging circuit 101; memory 601; and control circuit 604. Memory 601 may have configuration divided between an input memory and an output memory. Alternatively, registers or buffers may be provided in place of memory 601 and input/output ports may be provided that receive and supply data for carrying out butterfly computations.

FFT arithmetic unit 600 shown in FIG. 12 carries out four parallel processes, but the degree of parallel operations is not limited to four and may also be two or eight.

Control circuit 604 first gives a read address to memory 601. Memory 601 reads the row data that correspond to the given read address, disassembles the row data into a plurality of data units, and gives the data to input-side data rearranging circuit 100.

Control circuit 604 next gives a mode signal and a counter reset signal to input-side data rearranging circuit 100. Input-side data rearranging circuit 100 carries out data rearranging in accordance with the signals that have been given and gives the rearranged data to butterfly arithmetic circuit 602.

Control circuit 604 then gives a control signal to butterfly arithmetic circuit 602 and causes a butterfly computation to be carried out. The data resulting from the butterfly computation that butterfly arithmetic circuit 602 carries out is given to output-side data rearranging circuit 101.

Control circuit 604 next gives a mode signal and a counter reset signal to output-side data rearranging circuit 101 to bring about the rearrangement of the output data from butterfly arithmetic circuit 602.

Finally, control circuit 604 gives a write address to memory 601. Memory 601 organizes the plurality of units of data that have been supplied as output from output-side data rearranging circuit 101 and stores the data as row data corresponding to the write address that has been given.

Butterfly arithmetic circuit 602 is able to carry out a radix-4 or radix-2 butterfly computation and multiplication of the twiddle factor that corresponds to each. FFT arithmetic unit 600 is thus able to carry out radix-4 or radix-2 butterfly computations for data in memory 601 and carry out writing to memory 601. This series of operations is referred to as the processing of one stage. For example, 16-point FFT can be realized by two stages of repeated radix-4 butterfly computations. Alternatively, 32-point FFT can be realized by two stages of radix-4 butterfly computations and one stage of radix-2 butterfly computation for a total of three stages.

A single FFT arithmetic unit is provided with two or more butterfly arithmetic circuits, and data rearranging circuit 1 can be provided between these butterfly arithmetic circuits. Adopting this configuration enables two or more butterfly computations to be carried out in one stage. Arranging a plurality of butterfly arithmetic circuits 602 in a cascade connection enables the reduction of the overhead due to the processes for input and output of data to memory and a consequent improvement of the processing efficiency.

An example of the data rearrangement operation by the data rearranging circuit of the present Example is next described.

Figure 1:
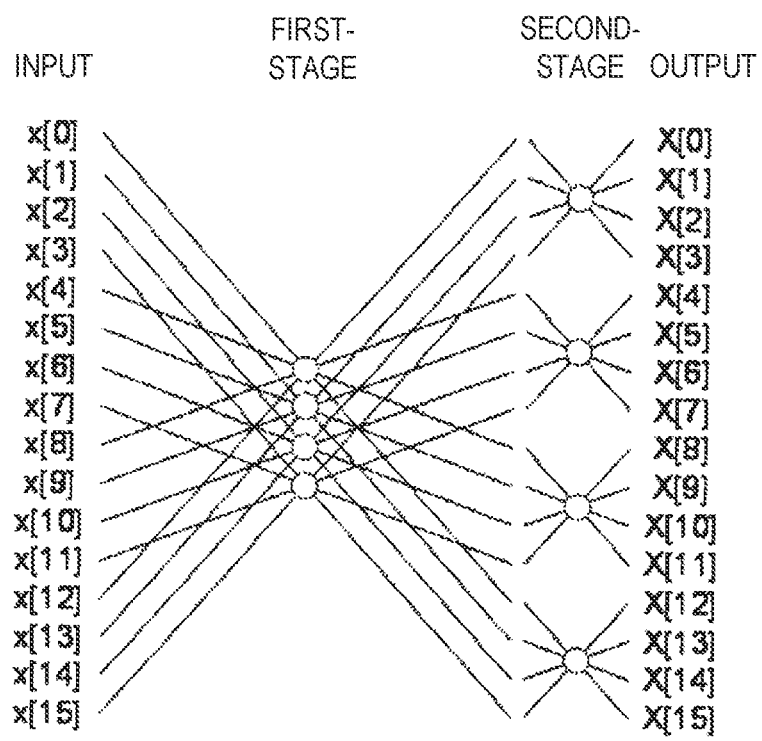
FIG. 1 is a block diagram of a 16-point FFT.
Figure 2:
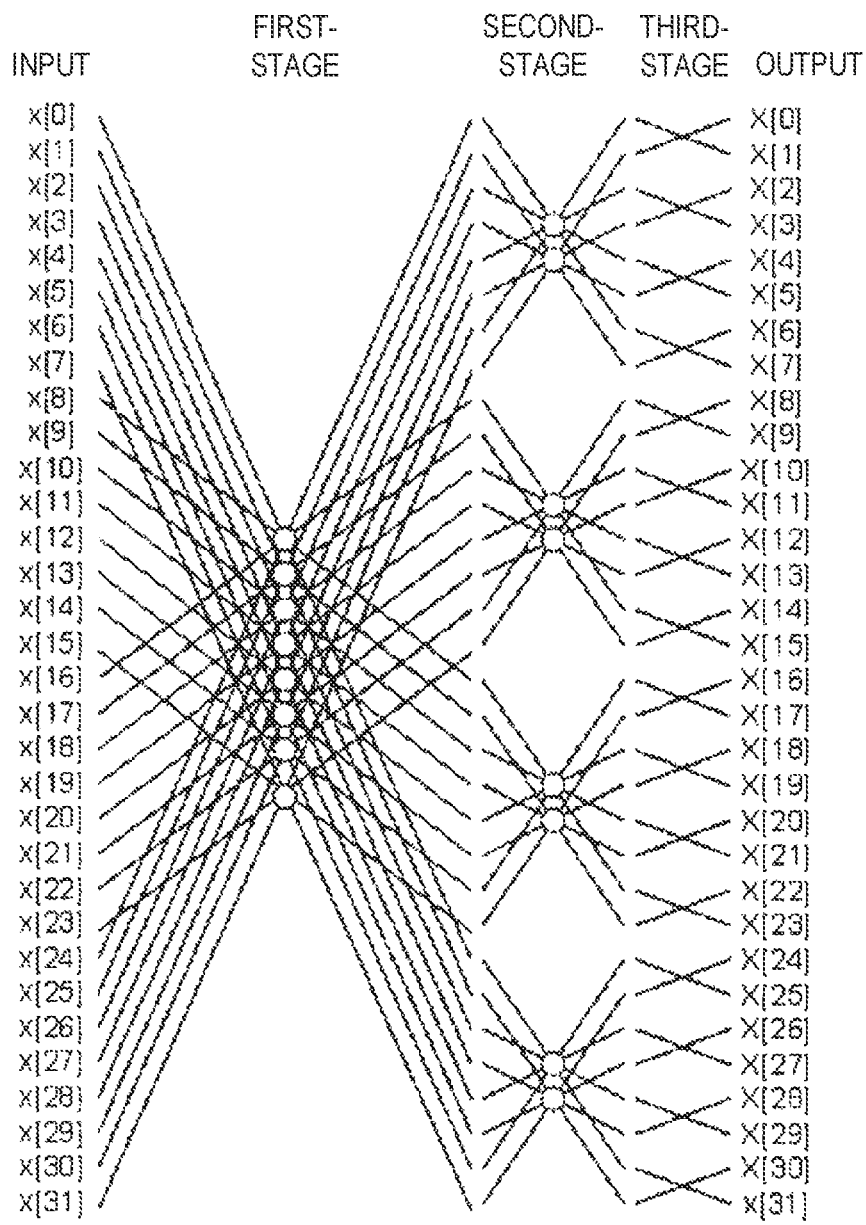
FIG. 2 is a block diagram of a 32-point FFT.
Figures 3, 4:
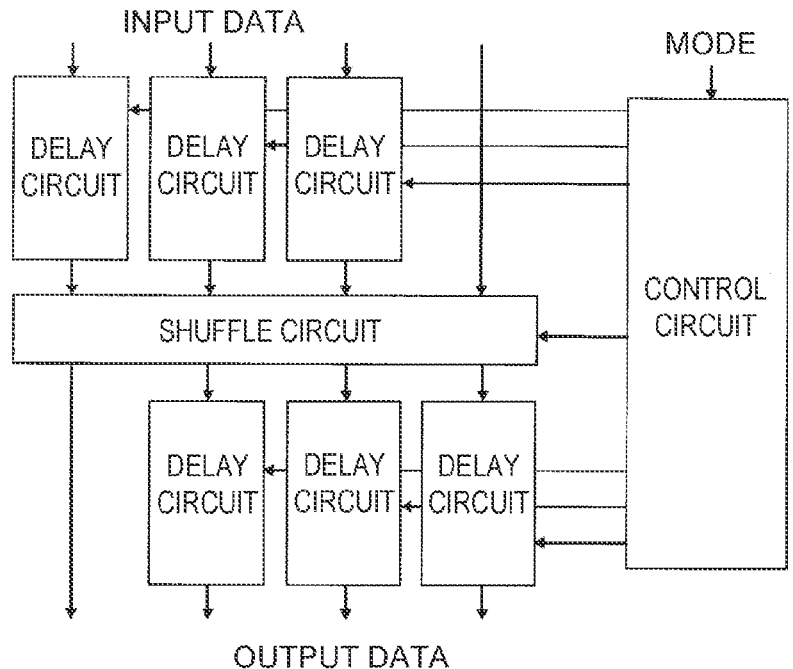
FIG. 3 shows an example of the configuration of a data rearranging circuit.
FIG. 4 shows an example of input data rearrangement of a 32-point FFT and a 16-point FFT that uses the data rearranging circuit.
Figure 13:
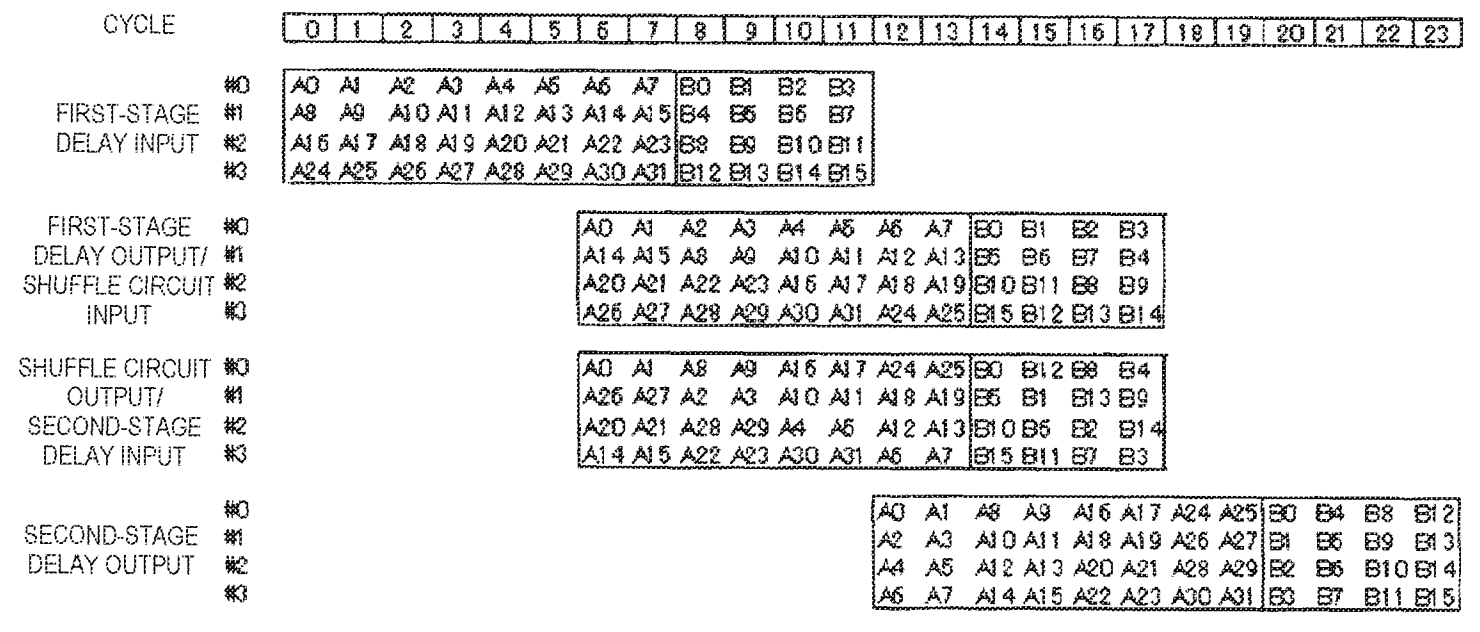

FIG. 13 shows an example of the manner of data rearrangement using the data rearranging circuit of the present Example. In this case, as in the data rearranging circuit shown in FIG. 4, the input data to a second-stage butterfly computation of 32-point FFT and the input data to a second-stage butterfly computation of 16-point FFT are each rearranged.

Switching of the temporal order of data is carried out in each of the circuits of first-stage delays #1 to #3 and second-stage delays #1 to #3. As can be understood from FIG. 13, first-stage variable delay circuits and second-stage variable delay circuits require the same number of cycles for data rearrangement processing in rearrangement for 32-point FFT and rearrangement for 16-point FFT. As a result, input data can be continuously applied as input without causing data collisions and processing throughput can therefore be maximized. The number of cycles required for data rearrangement process in each FFT is longer than in the data rearranging circuit shown in FIG. 4, but in a state in which switching occurs frequently between FFT of a different number of points, the total processing time of the data rearrangement process of a plurality of FFT can be reduced.

Figure 14:
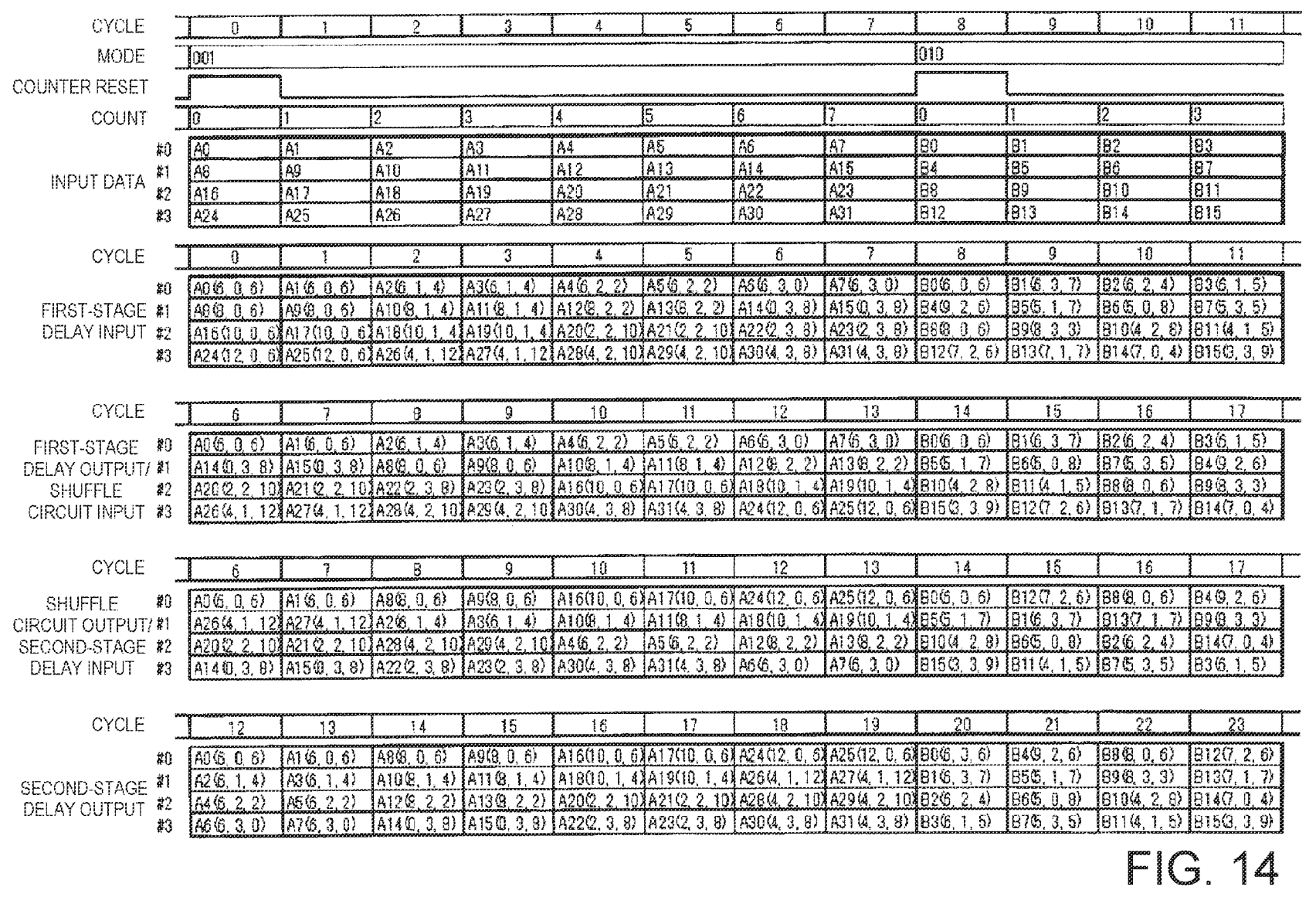

FIG. 14 shows an even more detailed timing chart that includes control information. In FIG. 14, coupled data are expressed in the format "data name (first-stage delay amount, shuffle control signal, second-stage delay amount)." The mode signal conferred from control circuit 604 shown in FIG. 12 is "001" during the first eight cycles and "010" during the next four cycles. The first eight cycles correspond to 32-point FFT, and the next four cycles correspond to 16-point FFT.

A count reset signal is asserted at cycle 0 and cycle 8, and counter 5 shown in FIG. 5 is thus reset. The operation mode indicated by the mode signal and the control information corresponding to the count value indicated by counter 5 are coupled with the input data and applied as input to first-stage variable delay circuits 20 to 23. For example, the control information (6, 0, 6) is coupled to data A0.

As shown in FIG. 14, control information of the first-stage and second-stage delay amounts and the shuffle circuit is coupled to the coupled data that is applied to first-stage variable delay circuits 20 to 23. After variable delay circuits 20 to 23 have used, of this control information, the first-stage delay amounts to carry out first-stage delay processing, the data are applied as input to shuffle circuit 3. As shown in FIG. 14, it can be seen that of coupled data that have been received in the order A8, A9, . . . , A14 at input port #1 of first-stage variable delay circuit (20), A14 and A15 (cycles 6 and 7) are supplied before A8 to A13 (cycles 8 to 13) and switching of the temporal order has been carried out.

In shuffle circuit 3, of the control information that is contained in the coupled data that have been received, the control information to the shuffle circuit is used to carry out spatial switching of data. Referring to the shuffle circuit output of FIG. 14, it can be seen that the switching of data has occurred at #1 to #3 of cycle 6.

In second-stage variable delay circuits 24 to 27, the second-stage delay amounts contained in the coupled data that have been received are used to effect second-stage delay processing. For example, in the example of FIG. 14, it can be seen that, of A14 (cycle 6) and A6 (cycle 12) that have been received at input port #3 of a second-stage variable delay circuit (27), A6 (cycle 12) has been supplied before A14 (cycle 14) in the output of the second-stage variable delay circuit and that switching of the temporal order has been carried out.

The application and use of the variable delay circuits and data rearranging circuits of the exemplary embodiment and Example of the present invention described hereinabove is not limited to FFT.

Although the present invention has been described with reference to exemplary embodiments, the present invention is not limited to the exemplary embodiments. The configuration and details of the present invention as defined in the claims are open to various modifications within the scope of the invention that will be clear to one of ordinary skill in the art.

This application is based upon and claims the benefits of priority from Japanese Patent Application No. 2009-218919, filed on Sep. 24, 2009, the disclosure of which is incorporated herein its entirety by reference.

CITATION LIST

Patent Literatures
  Patent Literature 1: JP-A-2008-537655
  Patent Literature 2: JP-A-2003-150576
  Patent Literature 3: JP-A-10-283341
  Patent Literature 4: JP-A-06-342449
  Patent Literature 5: JP-A-2002-504250
  Patent Literature 6: JP-A-2005-235045

The invention claimed is:
1. A data rearranging circuit comprising:
   variable delay means that, by giving to each unit of data of a data group that is applied as input to a plurality of ports in a plurality of cycles, a delay of a number of delay cycles that differs for each input cycle, and moreover, for each port, switches order of data in the same port and supplies the result as the data group at a predetermined delay;
   control means that supplies control information that includes said number of delay cycles that is used in the variable delay means; and
   shuffle means that is connected to a stage before and after said variable delay means, that switches, among ports in the same cycle, data applied as input to a plurality of ports in a plurality of cycles, and that supplies the result as output,
   wherein shuffle information that indicates switching in said shuffle means is further included in said control information that is supplied by said control means.
2. The data rearranging circuit as set forth in claim 1, wherein said variable delay means further includes:
   a first variable delay circuit that gives delay of a number of delay cycles that differs for each input cycle, and more- over, for each port to input data to a plurality of ports and supplies the result to said shuffle means; and a second variable delay circuit that gives a delay of a number of delay cycles that differs for each input cycle, and moreover, for each port to data received as input in a plurality of ports from said shuffle means.

3. The data rearranging circuit as set forth in claim 1, further comprising:

count means that counts progression of cycles, wherein said control means takes as input a count value of said count means and an operation mode that indicates a data switching method, and generates said control information.

4. The data rearranging circuit as set forth in claim 1, further comprising:

coupling means that couples said control information that is supplied from said control means with input data, wherein said variable delay means refers to said control information that is coupled with said input data and acquires said number of delay cycles that is contained in the control information.

5. The data rearranging circuit as set forth in claim 2, further comprising:

count means that counts progression of cycles, wherein said control means takes as input a count value of said count means and an operation mode that indicates a data switching method, and generates said control information.

6. The data rearranging circuit as set forth in claim 2, further comprising:

coupling means that couples said control information that is supplied from said control means with input data, wherein said variable delay means refers to said control information that is coupled with said input data and acquires said number of delay cycles that is contained in the control information.

7. The data rearranging circuit as set forth in claim 3, further comprising:

coupling means that couples said control information that is supplied from said control means with input data, wherein said variable delay means refers to said control information that is coupled with said input data and acquires said number of delay cycles that is contained in the control information.

8. A data rearrangement method comprising:

generating control information that includes a number of delay cycles that differs for each input cycle and moreover for each port, the control information being established such that order of data in the same port for each unit of data of a data group that is applied as input to a plurality of ports and in a plurality of cycles is switched and the data group has a predetermined delay;

based on said control information, giving to input data a delay of a number of delay cycles that differs for each input cycle and moreover for each port and supplying the result; and in a stage before or after giving said delay, switching, among ports in the same cycle, data applied as input to a plurality of ports in a plurality of cycles, and supplying the result as output, wherein shuffle information which controls the switching is further included in said control information.

* * * * *

UNITED STATES PATENT AND TRADEMARK OFFICE
CERTIFICATE OF CORRECTION

| | | |
|---|---|---|
| PATENT NO. | : 9,002,919 B2 | Page 1 of 1 |
| APPLICATION NO. | : 13/497553 | |
| DATED | : April 7, 2015 | |
| INVENTOR(S) | : Yuki Kobayashi and Katsutoshi Seki | |

It is certified that error appears in the above-identified patent and that said Letters Patent is hereby corrected as shown below:

In the specification,

Column 2, Line 29: Delete "x3," and insert -- x2, --

Signed and Sealed this
Seventeenth Day of November, 2015

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 9,002,919 B2 |
| APPLICATION NO. | : 13/497553 |
| DATED | : April 7, 2015 |
| INVENTOR(S) | : Yuki Kobayashi and Katsutoshi Seki |

It is certified that error appears in the above-identified patent and that said Letters Patent is hereby corrected as shown below:

In the specification,

Column 2, Line 39: Delete "x3," and insert -- x2, --

Signed and Sealed this
Twenty-fourth Day of November, 2015

Michelle K. Lee
*Director of the United States Patent and Trademark Office*